(12) United States Patent
Mellet et al.

(10) Patent No.: US 11,662,005 B1
(45) Date of Patent: May 30, 2023

(54) ELECTRIC VEHICLE DRIVE SYSTEM WITH REVERSIBLE TORQUE CONVERTER

(71) Applicant: GM GLOBAL TECHNOLOGY OPERATIONS LLC, Detroit, MI (US)

(72) Inventors: Edward W Mellet, Rochester Hills, MI (US); Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/932,373

(22) Filed: Sep. 15, 2022

(51) Int. Cl.
*F16H 45/02* (2006.01)
*B60K 1/00* (2006.01)
*B60K 17/02* (2006.01)

(52) U.S. Cl.
CPC .............. *F16H 45/02* (2013.01); *B60K 1/00* (2013.01); *B60K 17/02* (2013.01); *B60Y 2200/91* (2013.01)

(58) Field of Classification Search
CPC .............. F16H 45/02; F16H 2045/002; F16H 2045/005; B60K 1/00; B60K 17/02; B60K 17/04; B60K 17/26; B60Y 2200/91
See application file for complete search history.

(56) References Cited

U.S. PATENT DOCUMENTS

| 4,354,401 A * | 10/1982 | Omitsu | F16H 61/66254 477/41 |
| 5,031,479 A * | 7/1991 | Ibamoto | F16H 61/0403 477/110 |
| 8,330,400 B2 * | 12/2012 | Yang | F16H 3/003 318/400.07 |
| 8,499,912 B2 | 8/2013 | Samie et al. | |
| 2008/0011570 A1 * | 1/2008 | Kubota | F16H 45/02 192/3.29 |
| 2011/0005215 A1 * | 1/2011 | Ota | B60W 10/08 60/341 |
| 2014/0124319 A1 * | 5/2014 | Bertram | F16H 45/02 192/3.29 |
| 2020/0325971 A1 * | 10/2020 | Matsuoka | F16H 47/08 |
| 2021/0018068 A1 * | 1/2021 | Matsuoka | F16H 3/089 |
| 2021/0079991 A1 * | 3/2021 | Maurel | F16H 47/06 |
| 2022/0399779 A1 * | 12/2022 | Matsuoka | H02K 7/10 |

* cited by examiner

*Primary Examiner* — Timothy Hannon
*Assistant Examiner* — Farhana Pervin
(74) *Attorney, Agent, or Firm* — Lorenz & Kopf LLP

(57) ABSTRACT

A drive system includes an electric machine that generates a torque. An output shaft rotates bi-directionally and receives the torque. A coupling is disposed between the electric machine and the output shaft. The coupling includes a torque converter that multiplies the torque. One clutch transfers the torque from the electric machine to the torque converter, when the electric machine operates in a first rotational direction. Another clutch transfers the torque from the electric machine to the torque converter, when the electric machine operates in a second rotational direction that is opposite to the first rotational direction. A gearset includes a number of meshing gears and is disposed between the electric machine and the output shaft to transfer the torque to the output shaft.

20 Claims, 6 Drawing Sheets

ELECTRIC VEHICLE DRIVE SYSTEM WITH REVERSIBLE TORQUE CONVERTER

INTRODUCTION

The present disclosure relates to drive systems that include electric machines, and more particularly to drive systems for electric vehicles that include a torque converter that operates to transfer torque in both forward and reverse modes of operation of the electric machine.

Propulsion systems in electric vehicles include an electric motor that drives the vehicle's wheels, often through a driveline with some form of gearing system. The gearing system may include a gearbox near the motor and may also include differential gearboxes at one or more of the vehicle's axles. Sometimes, such as in transaxles, the gearbox and the differential may be combined. The electric motor is supplied with power from an energy source such as a battery to generate torque. The torque supplied by the motor is delivered to the wheels through the driveline.

In electric vehicles, the motor alone generates the torque delivered to the driven wheels, so vehicle performance is determined by the torque characteristics of the motor. Motors may operate efficiently over a wide speed range and so unlike vehicles with internal combustion engines, electric vehicles generally use only one gear ratio. The gearing system used is generally limited to operating at that one gear ratio because adding a multi-speed transmission would add weight, complexity and inefficiencies. Accordingly, the electric motor is sized to supply sufficient torque for all design operating conditions at the one gear ratio. Generally, smaller motors produce less torque and so reducing motor size is limited by the torque requirements of the application.

It would be desirable to use smaller motors in electric vehicle applications without incurring the drawbacks of adding a multi-speed transmission to effect a variety of gear ratios for torque transfer. Furthermore, other desirable features and characteristics of the present disclosure will become apparent from the subsequent detailed description and the appended claims, taken in conjunction with the accompanying drawings and the foregoing technical field and background.

SUMMARY

In a number of embodiments, a drive system includes an electric machine that generates a torque. An output shaft rotates bi-directionally and receives the torque. A coupling is disposed between the electric machine and the output shaft. The coupling includes a torque converter that multiplies the torque. One clutch transfers the torque from the electric machine to the torque converter, when the electric machine operates in a first rotational direction. Another clutch transfers the torque from the electric machine to the torque converter, when the electric machine operates in a second rotational direction that is opposite to the first rotational direction. A gearset includes a number of meshing gears and is disposed between the electric machine and the output shaft to transfer the torque to the output shaft.

In additional embodiments, two one-way clutches are engageable between the coupling and the gearset. The electric machine is configured to operate in a forward direction and in a reverse direction. One of the one-way clutches is configured to transfer the torque to the gearset when the electric machine operates in the forward direction but not when the electric machine operates in the reverse direction. Another of the one-way clutches is configured to transfer the torque to the gearset when the electric machine operates in the reverse direction but not when the electric machine operates in the forward direction.

In additional embodiments, the two clutches and the two one-way clutches each comprise passively engaging and disengaging devices.

In additional embodiments, the one one-way clutch does not transfer the torque to the gearset when the electric machine operates in the reverse direction, and the other one-way clutch does not transfer the torque to the gearset when the electric machine operates in the forward direction.

In additional embodiments, the torque converter includes a first vane section configured to operate alternately as a pump impeller of the torque converter and as a turbine of the torque converter, and includes a second vane section configured to operate alternately as the pump impeller of the torque converter and as the turbine of the torque converter.

In additional embodiments, a stator is disposed between the first vane section and the second vane section.

In additional embodiments, the output shaft is configured to drive vehicle wheels.

In additional embodiments, the vehicle wheels are configured to drive, through the gearset and the coupling, the electric machine as a generator.

In additional embodiments, the coupling includes a lockup clutch configured to bypass the torque converter.

In additional embodiments, the bypass clutch includes an actuator that is operated externally from the torque converter.

In a number of other embodiments, a drive system includes an electric machine configured to generate a torque in both a first rotational direction and in a second rotational direction that is opposite the first rotational direction. An output shaft is configured to rotate bi-directionally and to receive the torque. The output shaft is configured to drive a vehicle driveline. A coupling is disposed between the electric machine and the output shaft. The coupling includes a torque converter configured to multiply the torque, wherein the torque converter operates hydrodynamically. A first clutch is configured to transfer the torque from the electric machine to the torque converter, when the electric machine operates in a first rotational direction. A second clutch is configured to transfer the torque from the electric machine to the torque converter, when the electric machine operates in a second rotational direction that is opposite to the first rotational direction. A gearset includes a number of meshing gears and is disposed between the electric machine and the output shaft. The gearset is configured to transfer the torque to the output shaft and delivers one gear ratio only.

In additional embodiments, a first one-way clutch is engaged between the coupling and the gearset. A second one-way clutch is engaged between the coupling and the gearset. The electric machine is configured to operate in a forward direction and in a reverse direction. The first one-way clutch is configured to transfer the torque to the gearset when the electric machine operates in the forward direction. The first one-way clutch does not transfer the torque to the gearset when the electric machine operates in the reverse direction. The second one-way clutch is configured to transfer the torque to the gearset when the electric machine operates in the reverse direction. The second one-way clutch does not transfer the torque to the gearset when the electric machine operates in the forward direction.

In additional embodiments, the first clutch, the second clutch, the first one-way clutch, and the second one-way clutch each comprise passively engaging and disengaging devices.

In additional embodiments, the torque converter includes a first vane section configured to operate alternately as a pump impeller of the torque converter and as a turbine of the torque converter. A second vane section is configured to operate alternately as the pump impeller of the torque converter when the first vane section operates as the turbine, and is configured to operate as the turbine of the torque converter when the first vane section operates as the pump impeller.

In additional embodiments, a stator is disposed between the first vane section and the second vane section.

In additional embodiments, the output shaft is configured to drive vehicle wheels through a driveline.

In additional embodiments, the vehicle wheels are configured to drive, through the gearset and the coupling including the torque converter, the electric machine as a generator.

In additional embodiments, the coupling includes a lockup clutch configured to bypass the torque converter. The bypass clutch includes an actuator that is operated externally from the torque converter.

In additional embodiments, the first and second clutches alternately engage the electric machine.

In a number of additional embodiments, a drive system for a vehicle includes an electric machine. The electric machine is configured to generate a torque in both a first rotational direction and in a second rotational direction. The second rotational direction is opposite the first rotational direction. An output shaft is configured to rotate bi-directionally and to receive the torque. The output shaft is configured to drive wheels of the vehicle through a vehicle driveline. A coupling is disposed between the electric machine and the output shaft. The coupling includes a torque converter. The torque converter is configured to multiply the torque. The torque converter operates hydrodynamically and includes a pump impeller configured to pump a fluid and a turbine configured to rotate in response to the fluid when pumped. A first clutch is configured to transfer the torque from the electric machine to the torque converter, when the electric machine operates in the first rotational direction. A second clutch is configured to transfer the torque from the electric machine to the torque converter, when the electric machine operates in the second rotational direction. A gearset includes a number of meshing gears. To transfer the torque. The gearset is disposed between the electric machine and the output shaft. The gearset is configured to transfer the torque from the electric machine to the output shaft. The gearset is configured to transfer a regenerative torque from the wheels, through the gearset and the coupling to the electric machine.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
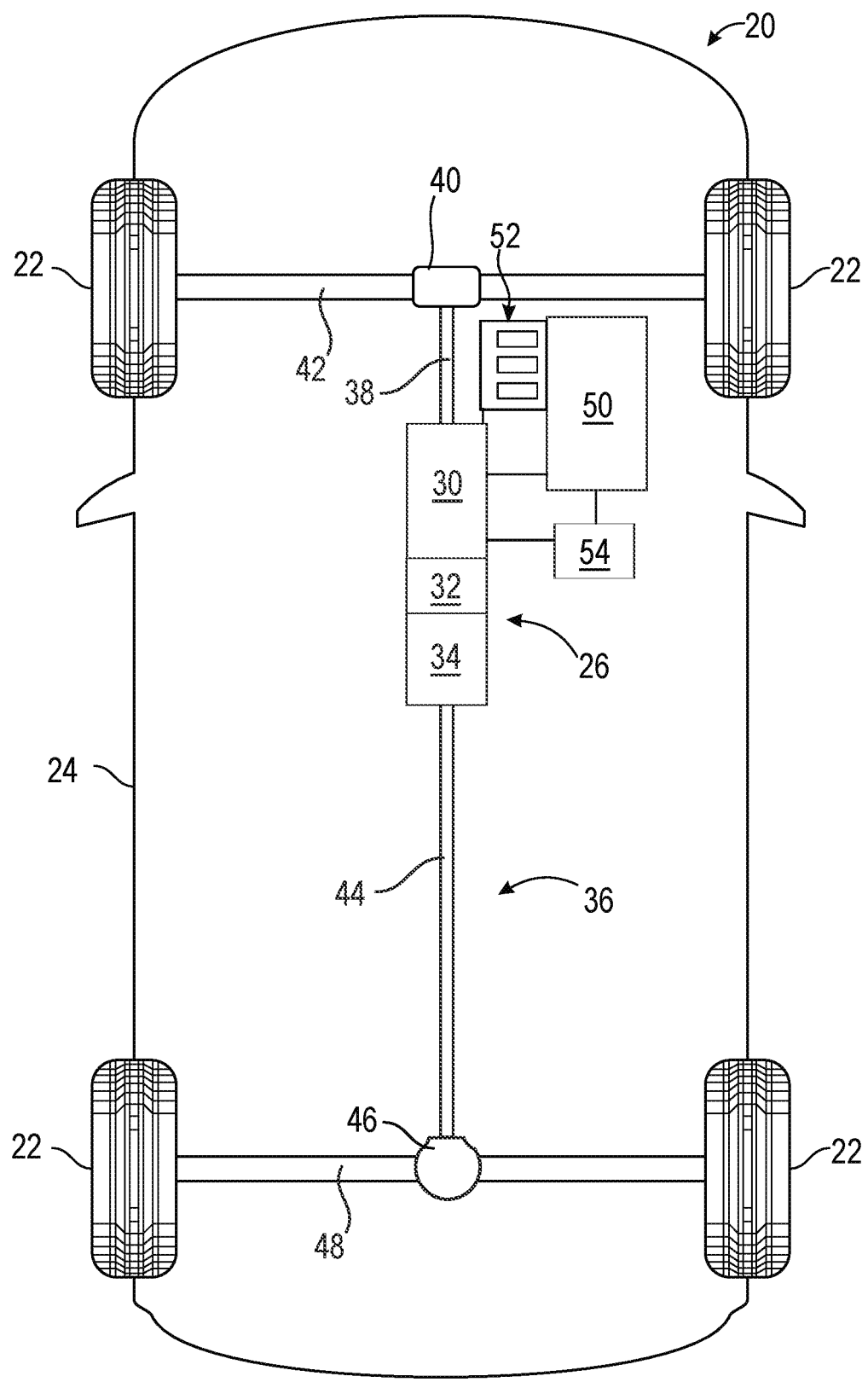
FIG. 1 is a schematic illustration of an electric vehicle with a drive system including a torque converter, in accordance with various embodiments.

Referring to FIG. 1, in a number of embodiments, a vehicle includes a number of wheels 22. The vehicle 20 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive. In other embodiments, the vehicle 20 may be any one of another different types of land, sea or air vehicle with a motor supplying power to propel the vehicle 20. As depicted in FIG. 1, the vehicle 20 includes a body 24 supported by the wheels 22. The body 24 may be arranged on, or integrated with, a chassis (not shown). In various embodiments the vehicle 20 may differ from that depicted in FIG. 1. For example, in certain embodiments the number of wheels 22, the drive axles, and/or the style of the body 24 may vary.

An electric drive system with a propulsion system 26 is included in a vehicle 20. Although the electric drive system is described within the context of a vehicle 20, the current disclosure is not limited to that application, and is applicable wherever benefits such as using a motor with a reduced size is desirable. In general, the propulsion system 26 may include an electric machine 30, a coupling 32 and a gearset 34. In the embodiment illustrated in FIG. 1, the propulsion system 26 supplies torque to drive the wheels 22 through a driveline 36. In various embodiments, the driveline 36 may be configured to couple the front wheels 22 with the propulsion system 26, such as through shaft 38, gearbox 40 and axle 42. In other embodiments, the driveline 36 may be configured to couple the rear wheels 22 with the propulsion system 26, such as through the shaft 44, the gearbox 46 and the axle 48. As illustrated, the driveline 36 is configured to couple all four wheels 22 with the propulsion system 26.

Figure 2:
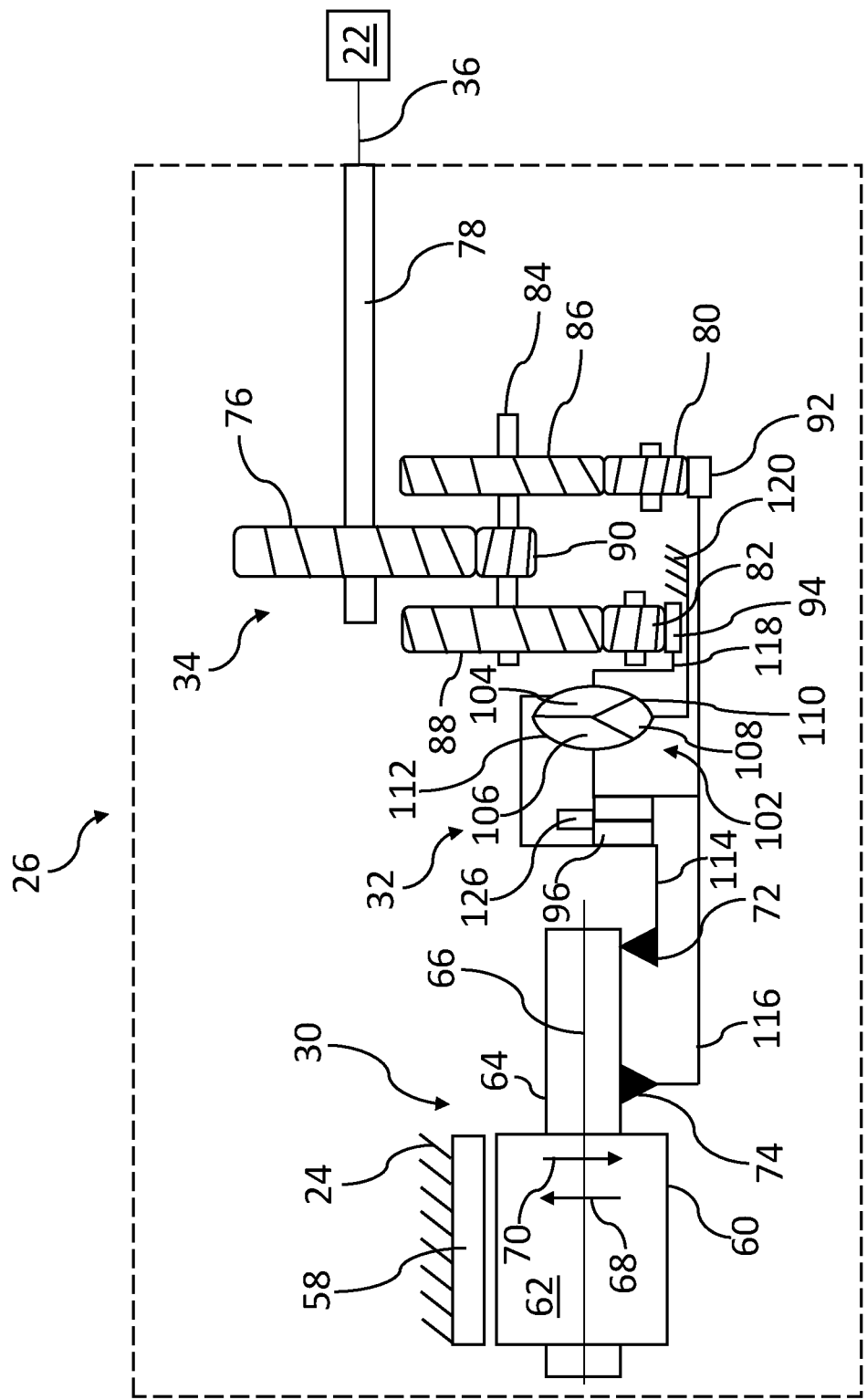
FIG. 2 is a schematic illustration of the drive system of FIG. 1, in accordance with various embodiments.

The electric machine 30 may be any of various types of electric motors that operate to supply rotary torque to the driveline 36. The electric machine 30 may also be capable of operating as a generator receiving rotary torque from the driveline 36. The coupling 32 connects the electric machine 30 with the driveline 36, such as through the gearset 34, and is capable of operating to transfer torque in either direction. In the current embodiment, the coupling 32 may include a torque converter (such as shown in FIG. 2), capable of multiplying the torque as it is transferred as further described below. The gearset 34 may include a number of meshing gears to transfer torque to and from the driveline 36 and may be configured with a single fixed gear ratio. The gearset 34 may be integrated with the coupling 32. In embodiments, the electric machine 30, the coupling 32 and the gearset 34 may be integrated in an electric drive unit. The gearboxes 40, 46 transfer torque from their respective shaft 38, 44 to their respective axle 42, 48 and may provide a differential function in splitting torque to the wheels 22. The gearboxes 40, 46 may also each have a single fixed gear ratio.

The electric machine 30 is supplied with power by a rechargeable energy storage system (RESS) 50. The RESS 50 is mounted on the body 24 of the vehicle 20, and is electrically connected with the power electronics 52. In the current embodiment, the RESS 50 comprises at least one rechargeable battery having a pack of battery cells. In other embodiments the RESS 50 comprises another type of electrical energy storage device. The power electronics 52 may include various electric vehicle elements such as a power inverter module, an accessory power module, an onboard charger module, etc. A controller 54 is coupled with the electric machine 30, the power electronics 52, and the RESS 50. As will be appreciated, the controller 54 may be coupled to a number of other devices and systems of the vehicle 20. The controller 54 utilizes data and information and measured values from various sensors (not shown). Generally, the controller 54 is configured to receive inputs from the various sensors which are configured to generate signals in proportion to various physical input parameters associated with the vehicle 20, its subsystems, and other interrelated systems. For example, the controller 54 is configured to operate the electric machine 30 at various rotational speeds and in both rotational directions to propel the vehicle at various speeds and in forward and reverse directions.

Referring to FIG. 2, a part of the propulsion system 26 is illustrated in schematic form with greater detail. The electric machine 30 includes a stator 58 fixed to the body 24 of the vehicle 20 and a rotor 60, rotatably supported within the stator 58. The rotor 60 generally includes a rotor core 62 mounted on a shaft 64 and rotates about an axis 66 in response to magnetic flux of the stator 58. Current may be supplied to the stator 58 by the RESS 50 and the power electronics 52 to generate the magnetic flux. The current may be supplied in variations to rotate the rotor 60 at various speeds and in both rotational directions 68, 70. For purposes of the current disclosure, one rotational direction 68 is referred to as the forward direction 68 because rotation of the rotor 60 propels the vehicle 20 forward, and another rotational direction 70 is referred to as the reverse direction 70 because it propels the vehicle 20 in reverse.

A forward clutch 72 and a reverse clutch 74 engage the rotor 60 and both are configured to operate as one-way clutches. The forward clutch 72 is closed or engaged to transmit torque when the rotor 60 rotates in the forward direction 68 and is open or disengaged when the rotor 60 rotates in the reverse direction 70. The reverse clutch 74 is closed or engaged to transmit torque when the rotor 60 rotates in the reverse direction 70 and is open or disengaged when the rotor 60 rotates in the forward direction 68. The forward clutch 72 and the reverse clutch 74 may be any type of clutch that provides one-way operation such as sprag, roller, friction, etc., and may be passively actuated or actively controlled. In the current embodiment, the forward clutch 72 and the reverse clutch 74 are both passively actuated sprag-type clutches. The forward clutch 72 and the reverse clutch 74 are each disposed and connected to drive the gearset 34 through the coupling 32.

The gearset 34 includes an output gear 76 driving the wheels 22 through an output shaft 78 and the driveline 36. The output shaft 78 is configured to rotate bi-directionally. The output gear 76 may be driven by either of two input gears including forward input gear 80 and reverse input gear 82. A transfer shaft 84 supports three transfer gears including a forward transfer gear 86, a reverse transfer gear 88 and a common transfer gear 90, each fixed to rotate with the transfer shaft 84. The forward transfer gear 86 is in continuous meshing engagement with the forward input gear 80 and the reverse transfer gear 88 is in continuous meshing engagement with the reverse input gear 82. The common transfer gear 90 is in continuous meshing engagement with the output gear 76. As such, all gears in the gearset 34 rotate together including the forward input gear 80, the reverse input gear 82, the forward transfer gear 86, the reverse transfer gear 88, the common transfer gear 90, and the output gear 76.

The coupling 32 includes a number of torque transfer elements including shafts, clutches, housing sections and converter sections. The clutches of the coupling 32 include the forward clutch 72 and the reverse clutch 74. In addition, a one-way clutch 92 engages the forward input gear 80 and operates in a closed condition transferring torque to drive the forward input gear 80 when the electric machine 30 operates in the forward direction 68. When the electric machine 30 operates in the reverse direction 70, the one-way clutch 92 is open and does not transfer torque to the forward input gear 80. Another one-way clutch 94 engages the reverse input gear 82 and operates in a closed condition transferring torque to drive the reverse input gear 82 when the electric machine 30 operates in the reverse direction 70. When the electric machine 30 operates in the forward direction 68, the one-way clutch 94 is open and does not transfer torque to the reverse input gear 82. A lockup clutch 96 is also included in the coupling 32 to more directly transfer torque in certain situations as further discussed below.

The coupling 32 includes a torque converter 102 for transferring and multiplying torque between the electric machine 30 and the gearset 34. Including the torque multiplying function of the torque converter 102 provides the benefits of supplying more torque or of being able to downsize the electric machine 30 for a given application, if desired. The torque converter 102 includes vane sections 104 and 106 and includes a stator 108. The vane sections 104, 106 each include a number of vanes and a housing section 110, 112 that mate together to contain fluid. Each of the vane sections 104 and 106 operates alternately as an impeller to pump fluid in certain situations and as a turbine to extract energy from the pumped fluid in other situations. The stator 108 is disposed between the vane sections 104, 106, may include a number of vanes, and redirects pumped fluid helping in torque multiplication. The torque converter 102 may be constructed similar to one used with an internal combustion engine.

The vane section 104 of the torque converter 102 is connected with the electric machine 30 by an input system that includes a series of torque transfer elements including the housing section 110, a forward input shaft 114, and the forward clutch 72. The vane section 104 is also connected with the one-way clutch 94 through a series of torque transfer elements including the housing section 110 and a reverse output shaft 118. The vane section 106 of the torque converter 102 is connected with the electric machine 30 through a series of torque transfer elements that include the housing section 112, a dual shaft 116, and the reverse clutch 74. The vane section 106 is also connected with the one-way clutch 92 through a series of torque transfer elements including the housing section 112 and the dual shaft 116. While named "shafts," the forward input shaft 114, the reverse output shaft 118 and the dual shaft 116 may take a variety of physical forms that may be dictated by packaging constraints. Accordingly, the word shaft in this context includes shafts, frames, links, cups, plates, housings and other forms of torque transfer elements.

The lockup clutch 96 selectively locks the forward input and output of the torque converter 102. For example, the lockup clutch 96 may selectively lock together the housing sections 110 and 112. In embodiments, the lockup clutch 96 may selectively lock together the forward input shaft 114 and the dual shaft 116. Selective engagement of the lockup clutch 96 enables the electric machine 30 to be more directly connected with the gearset 34 by a direct mechanical connection, bypassing the fluid coupling of the torque converter 102. The lockup clutch 96 may be externally actuated, such as by an apply piston pressing through an apply-through bearing. This means that high pressure oil is not required in the torque converter 102 to actuate the lockup clutch 96. Not requiring high pressure oil in the torque converter 102 enables turning the torque converter 102 at high speeds associated with the electric machine 30. In embodiments, the lockup clutch 96 may be externally electronically controlled, such as by the controller 54 via an actuator 126. The lockup clutch 96 may include multiple clutch plates to provide a high torque capacity supporting a large amount of torque transfer. When lockup clutch 96 is disengaged, the electric machine 30 and the gearset 34 are hydrodynamically connected through operation of the torque converter 102, by the vane section 104, the vane section 106, and the stator 108.

The stator 108 of the torque converter 102 is grounded, such as to a housing 120. The ground may be through a clutch (not shown), that may operate to prevent rotation of the stator 108, such as in a direction opposite to the direction of rotation of the vane section 110 or 112 operating as the impeller, and/or to permit free-wheeling rotation, such as in the opposite direction, if desired. The stator 108 may also include a number of vanes that redirect fluid flowing between the vane section 104 and the vane section 106 to harvest kinetic energy enabling the torque converter 102 to multiply torque.

Figure 3:
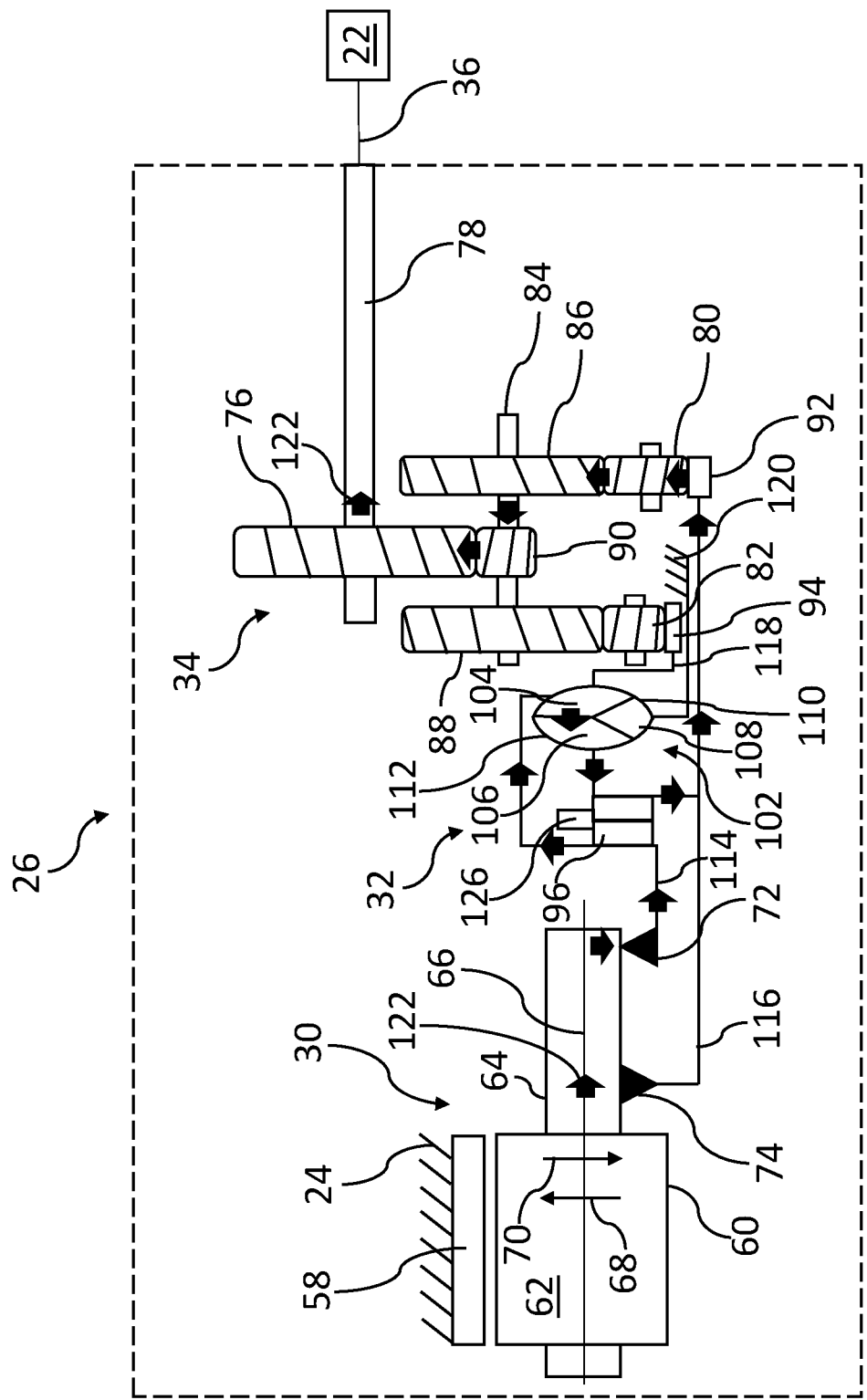
FIG. 3 is a schematic illustration of the drive system of FIG. 2 in a forward hydrodynamic converter mode, in accordance with various embodiments.

Referring to FIG. 3, operation of the propulsion system 26 in a forward hydrodynamic converter mode is functionally illustrated. For example, the propulsion system 26 operates in the forward hydrodynamic converter mode at, and following, launch of the vehicle 20 in forward from a standstill, and when accelerating. Torque is supplied by the electric machine 30 operating as a motor in the forward direction 68. The forward clutch 72 is engaged/closed and the reverse clutch 74 is disengaged/open. As a result, the forward input shaft 114 rotates in a forward compatible direction as driven by the shaft 64 and the dual shaft 116 is not driven by the electric machine 30. It should be noted that rotation of the dual shaft 116 is enabled by the reverse clutch 74 in a direction opposite to that at which it would rotate if driven by the electric machine 30. The torque transfer path 122 extends from the shaft 64 of the electric machine 30 to the output shaft 78 and therethrough to the driveline 36 and the wheels 22, driving the wheels in forward. From the shaft 64, torque is transferred through the forward clutch 72 to the forward input shaft 114 and through the housing section 110 of the torque converter 102 to the vane section 104. The vane section 104 operates as an impeller of a pump and pumps fluid in the torque converter 102. The vane section 106 operates as a turbine and is driven to rotate by the pumped fluid. Torque is transferred from the vane section 106 through the housing section 112 to the dual shaft 116. The dual shaft 116 rotates in a direction allowed by the disengaged/open reverse clutch 74 and transfers torque to the forward input gear 80 through the one-way clutch 92, which is engaged/closed. The forward input gear 80 rotates the forward transfer gear 86 and, as a result, the transfer shaft 84. The transfer shaft 84 rotates the common transfer gear 90, which rotates the output gear 76. Torque is transferred to the output shaft 78, the driveline 36 and the wheels 22, driving the vehicle 20 in forward. The reverse transfer gear 88 and the reverse input gear 82 rotate as allowed by the one-way clutch 94 but torque is not transferred through the one-way clutch 94, which freewheels.

Figure 4:
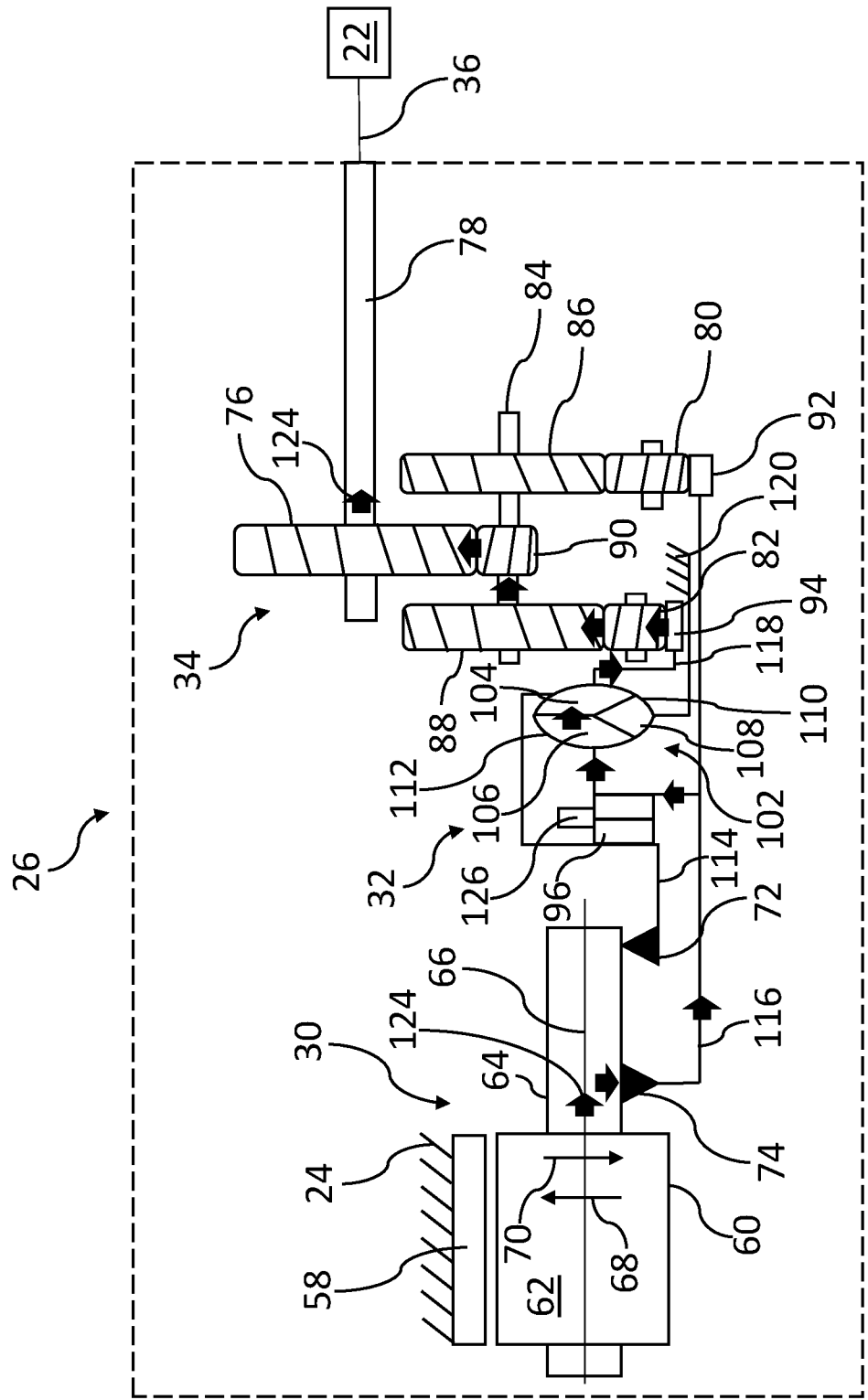
FIG. 4 is a schematic illustration of the drive system of FIG. 2 in a reverse hydrodynamic converter mode, in accordance with various embodiments.

Referring to FIG. 4, operation of the propulsion system 26 in a reverse hydrodynamic converter mode is functionally illustrated. For example, the propulsion system 26 operates in the reverse hydrodynamic converter mode when the vehicle 20 is operating in reverse. Torque is supplied by the electric machine 30 operating as a motor in the reverse direction 70. The reverse clutch 74 is engaged/closed and the forward clutch 72 is disengaged/open. As a result, the dual shaft 116 rotates in a reverse compatible direction as driven by the shaft 64 and the forward input shaft 114 is not driven by the electric machine 30. It should be noted that rotation of the forward input shaft 114 is enabled in a direction opposite to that at which it would rotate if driven by the electric machine 30. The torque transfer path 124 extends from the shaft 64 of the electric machine 30 to the output shaft 78 and therethrough to the driveline 36 and the wheels 22, driving the wheels in reverse. From the shaft 64, torque is transferred through the reverse clutch 74 to the dual shaft 116 and through the housing section 112 to the vane section 106. The vane section 106 operates as an impeller of a pump and pumps fluid in the torque converter 102. The vane section 104 operates as a turbine and is driven to rotate by the pumped fluid. Torque is transferred from the vane section 104 through the housing section 110 to the reverse output shaft 118. The reverse output shaft 118 transfers torque to the reverse input gear 82 through the one-way clutch 94, which is engaged/closed. The reverse input gear 82 rotates the reverse transfer gear 88 and, as a result, the transfer shaft 84. The transfer shaft 84 rotates the common transfer gear 90, which rotates the output gear 76. Torque is transferred to the output shaft 78, the driveline 36 and the wheels 22, driving the vehicle 20 in reverse. The forward transfer gear 86 and the forward input gear 80 rotate as allowed by the one-way clutch 92 but torque is not transferred through the one-way clutch 92, which freewheels.

Figure 5:
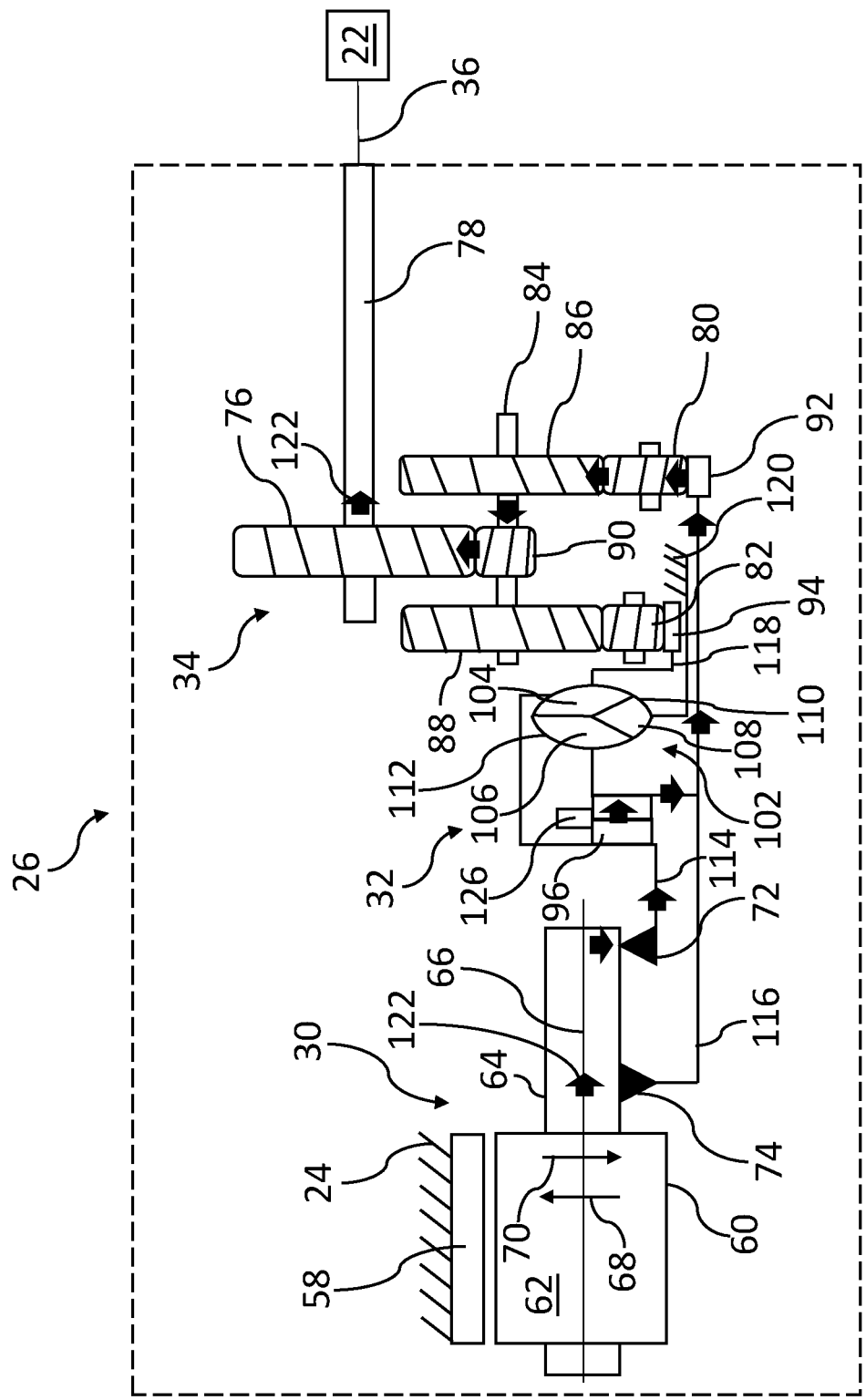
FIG. 5 is a schematic illustration of the drive system of FIG. 2 in a forward direct mode, in accordance with various embodiments.

Referring to FIG. 5, operation of the propulsion system 26 in a forward direct mode is illustrated in functional form. For example, the propulsion system 26 operates in the forward direct mode when efficiency optimization is desired and/or when the vehicle 20 is cruising at-speed. Torque is supplied by the electric machine 30 operating as a motor in the forward direction 68. The forward clutch 72 is engaged/closed and the reverse clutch 74 is disengaged/open. As a result, the forward input shaft 114 rotates in a forward compatible direction as driven by the shaft 64 and the dual shaft 116 is not driven by the electric machine 30. Again, rotation of the dual shaft 116 is enabled in a direction opposite to that at which it would rotate if driven by the electric machine 30. The torque transfer path 122 extends from the shaft 64 of the electric machine 30 to the output shaft 78 and therethrough to the driveline 36 and the wheels 22, driving the wheels in forward. From the shaft 64, torque is transferred through the forward clutch 72 to the forward input shaft 114 and to the housing section 110. The lockup clutch 96 may engage between the forward input shaft 114 and the dual shaft 116 or between the housing sections 110, 112. In either case, the hydrodynamic elements of the torque converter 102 are bypassed and a direct mechanical connection is established between the forward input shaft 114 and the dual shaft 116. The dual shaft 116 rotates in a direction allowed by the disengaged/open reverse clutch 74 and transfers torque to the forward input gear 80 through the one-way clutch 92, which is engaged/closed. The forward input gear 80 rotates the forward transfer gear 86 and, as a result, the transfer shaft 84. The transfer shaft 84 rotates the common transfer gear 90, which rotates the output gear 76. Torque is transferred to the output shaft 78, the driveline 36 and the wheels 22, driving the vehicle 20 in forward. The reverse transfer gear 88 and the reverse input gear 82 rotate as allowed by the one-way clutch 94 but torque is not transferred through the one-way clutch 94, which freewheels. In the forward direct mode, hydraulic losses are not encountered and the electric machine 30 is coupled with the wheels 22 through a purely mechanical linkage at a set overall gear ratio.

Figure 6:
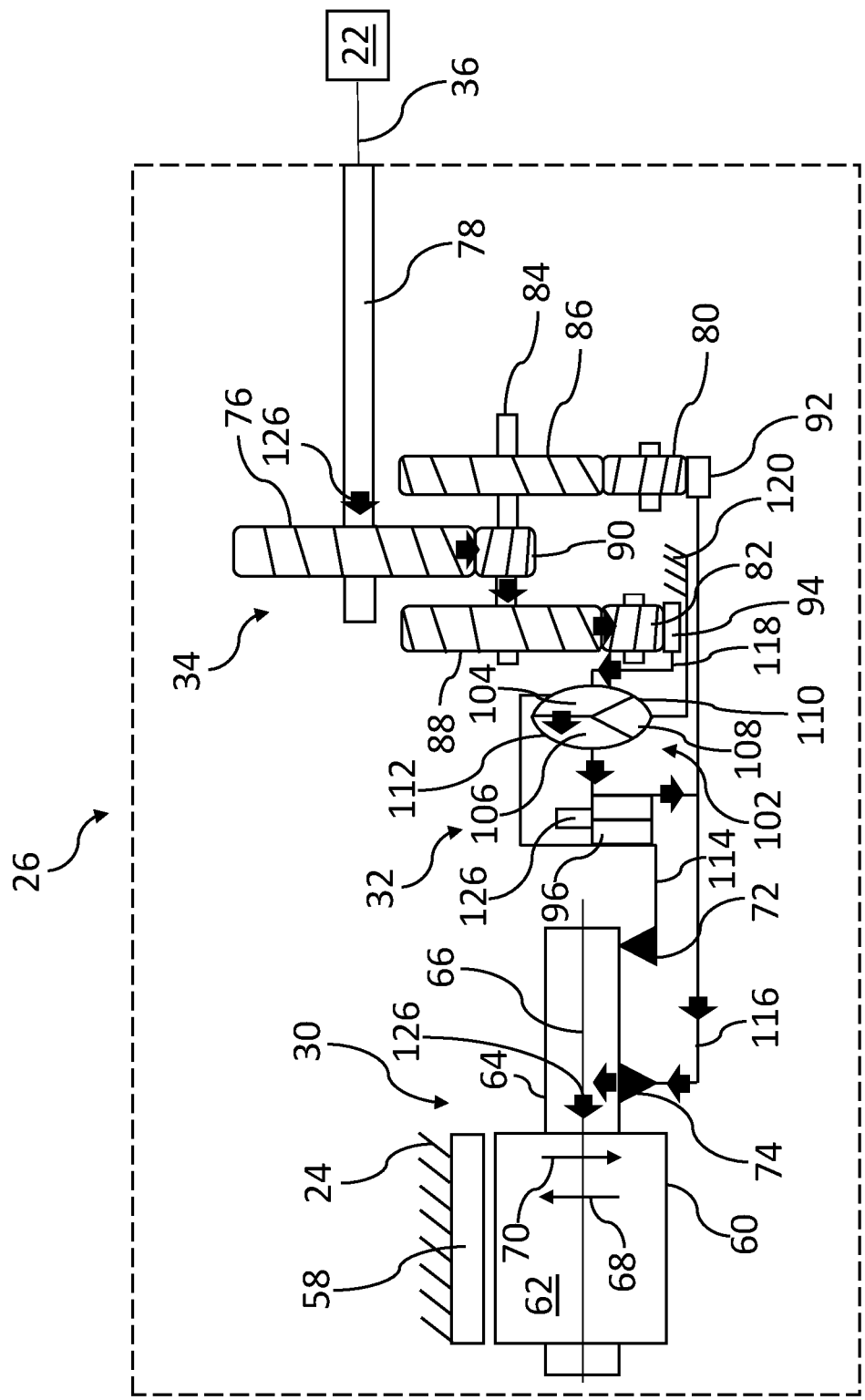
FIG. 6 is a schematic illustration of the drive system of FIG. 2 in a regeneration mode, in accordance with various embodiments.

Referring to FIG. 6, operation of the propulsion system 26 in a regeneration mode is illustrated in functional form. For example, the propulsion system 26 operates in the regeneration mode when the vehicle 20 is not accelerating and the controller 54 identifies an opportunity to recover energy, such as due to deceleration or braking of the vehicle 20. It should be noted that the wheels 22 are rotating in forward motion, meaning that the output shaft 78 is rotating in a compatible forward direction, which causes the one-way clutch 92 to freewheel in an overrunning condition and causes the one-way clutch 94 to engage/close transferring torque. Torque is transferred from the wheels 22 through the driveline 36 to the output shaft 78. The output shaft 78 transfers torque through the output gear 76, the common transfer gear 90, the transfer shaft 84 and the reverse transfer gear 88. The reverse transfer gear 88 transfers torque to the reverse input gear 82 and through the one-way clutch 94 to the reverse output shaft 118. It will be appreciated that to transfer torque through the one-way clutch 94, the reverse input gear 82 rotates in an opposite rotational direction as compared to when it acts to provide input into the gearset 34. From the reverse output shaft 118, torque is transferred through the housing section 110 and the vane section 104. The vane section 104 operates as a pump impeller pumping fluid that drives the vane section 106 as a turbine. The vane section 106 transfers torque to the housing section 112 and therethrough, to the dual shaft 116. Torque is then transferred to the shaft 64 through the reverse clutch 74 driving the rotor core 62 and operating the electric machine as a generator to charge the RESS 50. The transferred torque may be multiplied by the torque converter 102, optimizing charging.

Through the foregoing, an electrified propulsion system uses a torque converter to multiply torque both in forward and reverse. The propulsion system is a predominately passive device with controls needed only to control the lockup clutch. Use of an externally actuated lockup clutch enables lockup without use of high pressure converter oil optimizing efficiency. Including a hydrodynamic torque converter enables using a smaller electric motor for a given application, using a reduced gearset ratio for a given application, and/or enable more towing capability for a given application by increased torque.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof.

What is claimed is:

1. A drive system comprising:
an electric machine configured to generate a torque;
an output shaft configured to rotate bi-directionally in a forward direction and in a reverse direction, and to receive the torque;
a coupling disposed between the electric machine and the output shaft, the coupling including a torque converter configured to multiply the torque;
a first clutch configured to transfer the torque from the electric machine to the torque converter, when the electric machine operates in the forward direction;
a second clutch configured to transfer the torque from the electric machine to the torque converter, when the electric machine operates in the reverse direction that is opposite to the forward direction,
wherein the torque converter is configured to multiply the torque in both the forward direction and the reverse direction of the output shaft; and
a gearset including a number of meshing gears and disposed between the electric machine and the output shaft and configured to transfer the torque to the output shaft.

2. The drive system of claim 1, comprising:
a first one-way clutch engaged between the coupling and the gearset; and
a second one-way clutch engaged between the coupling and the gearset,
wherein the first one-way clutch is configured to transfer the torque to the gearset when the electric machine operates in the forward direction,
wherein the second one-way clutch is configured to transfer the torque to the gearset when the electric machine operates in the reverse direction.

3. The drive system of claim 2, wherein the first clutch, the second clutch, the first one-way clutch, and the second one-way clutch each comprise passively engaging and disengaging devices.

4. The drive system of claim 2, wherein:
the first one-way clutch does not transfer the torque to the gearset when the electric machine operates in the reverse direction, and
the second one-way clutch does not transfer the torque to the gearset when the electric machine operates in the forward direction.

5. The drive system of claim 1, wherein the torque converter includes a first vane section configured to operate alternately as a pump impeller of the torque converter and as a turbine of the torque converter; and
a second vane section configured to operate alternately as the pump impeller of the torque converter and as the turbine of the torque converter.

6. The drive system of claim 5, comprising a stator disposed between the first vane section and the second vane section.

7. The drive system of claim 1, wherein the output shaft is configured to drive vehicle wheels.

8. The drive system of claim 7, wherein the vehicle wheels are configured to drive, through the gearset and the coupling, the electric machine as a generator.

9. The drive system of claim 1, wherein the coupling includes a lockup clutch configured to bypass the torque converter.

10. The drive system of claim 9, wherein the lockup clutch includes an actuator that is operated externally from the torque converter.

11. A drive system comprising:
- an electric machine configured to generate a torque in both a first rotational direction and in a second rotational direction that is opposite the first rotational direction;
- an output shaft configured to rotate bi-directionally and to receive the torque, the output shaft configured to drive a vehicle driveline;
- a coupling disposed between the electric machine and the output shaft, the coupling including a torque converter configured to multiply the torque, wherein the torque converter operates hydrodynamically;
- a first clutch configured to transfer the torque from the electric machine to the torque converter, when the electric machine operates in the first rotational direction;
- a second clutch configured to transfer the torque from the electric machine to the torque converter, when the electric machine operates in the second rotational direction; and
- a gearset including a number of meshing gears and disposed between the electric machine and the output shaft and configured to transfer the torque to the output shaft,
- wherein the gearset delivers one gear ratio only,
- wherein the torque converter includes a first vane section configured to operate alternately as a pump impeller of the torque converter and as a turbine of the torque converter,
- wherein the torque converter includes a second vane section configured to operate alternately as the pump impeller of the torque converter when the first vane section operates as the turbine, and configured to operate as the turbine of the torque converter when the first vane section operates as the pump impeller.

12. The drive system of claim 11, comprising:
- a first one-way clutch engaged between the coupling and the gearset; and
- a second one-way clutch engaged between the coupling and the gearset,
- wherein the first rotational direction comprises a forward direction and the second rotational direction comprises a reverse direction,
- wherein the first one-way clutch is configured to transfer the torque to the gearset when the electric machine operates in the forward direction,
- wherein the first one-way clutch does not transfer the torque to the gearset when the electric machine operates in the reverse direction,
- wherein the second one-way clutch is configured to transfer the torque to the gearset when the electric machine operates in the reverse direction,
- wherein the second one-way clutch does not transfer the torque to the gearset when the electric machine operates in the forward direction.

13. The drive system of claim 12, wherein the first clutch, the second clutch, the first one-way clutch, and the second one-way clutch each comprise passively engaging and disengaging devices.

14. The drive system of claim 11, wherein the torque converter includes a first vane section connected with the electric machine by a first series of torque transfer elements and includes a second vane section connected with the electric machine through a second series of torque transfer elements.

15. The drive system of claim 11, comprising a stator disposed between the first vane section and the second vane section.

16. The drive system of claim 11, wherein the output shaft is configured to drive vehicle wheels through a driveline.

17. The drive system of claim 16, wherein the vehicle wheels are configured to drive, through the gearset and the coupling including the torque converter, the electric machine as a generator.

18. The drive system of claim 11, wherein the coupling includes a lockup clutch configured to bypass the torque converter, wherein the bypass clutch includes an actuator that is operated externally from the torque converter.

19. The drive system of claim 11, wherein the first and second clutches alternately engage the electric machine.

20. A drive system for a vehicle comprising:
- an electric machine configured to generate a torque in both a first rotational direction and in a second rotational direction that is opposite the first rotational direction;
- an output shaft configured to rotate bi-directionally and to receive the torque, the output shaft configured to drive wheels of the vehicle through a vehicle driveline;
- a coupling disposed between the electric machine and the output shaft, the coupling including a torque converter configured to multiply the torque, wherein the torque converter operates hydrodynamically with a pump impeller configured to pump a fluid and a turbine configured to rotate in response to the fluid when pumped;
- a first clutch configured to transfer the torque from the electric machine to the torque converter, when the electric machine operates in the first rotational direction;
- a second clutch configured to transfer the torque from the electric machine to the torque converter, when the electric machine operates in the second rotational direction;
- a gearset including a number of meshing gears and disposed between the electric machine and the output shaft and configured to transfer the torque to the output shaft and to transfer a regenerative torque from the wheels, through the coupling to the electric machine;
- a first one-way clutch engaged between the coupling and the gearset; and
- a second one-way clutch engaged between the coupling and the gearset,
- wherein the first one-way clutch is configured to transfer the torque to the gearset when the electric machine operates in the first rotational direction,
- wherein the second one-way clutch is configured to transfer the torque to the gearset when the electric machine operates in the second rotational direction.

* * * * *